(12) United States Patent
Gupta et al.

(10) Patent No.: US 9,116,940 B1
(45) Date of Patent: Aug. 25, 2015

(54) SEARCHING FOR JOIN CANDIDATES

(71) Applicant: Google Inc., Mountain View, CA (US)

(72) Inventors: Nitin Gupta, Mountain View, CA (US);
Alon Yitzchak Halevy, Los Altos, CA (US); Jayant Madhavan, Mountain View, CA (US); Tuan Anh Cao, Ithaca, NY (US); Sreeram Balakrishnan, Mountain View, CA (US)

(73) Assignee: Google Inc., Mountain View, CA (US)

( * ) Notice: Subject to any disclaimer, the term of this patent is extended or adjusted under 35 U.S.C. 154(b) by 130 days.

(21) Appl. No.: 13/862,768

(22) Filed: Apr. 15, 2013

(51) Int. Cl.
*G06F 17/30* (2006.01)

(52) U.S. Cl.
CPC ...... *G06F 17/30336* (2013.01); *G06F 17/3053* (2013.01)

(58) Field of Classification Search
CPC ............... G06F 17/30466; G06F 17/30498
See application file for complete search history.

(56) References Cited

U.S. PATENT DOCUMENTS

| | | | |
|---|---|---|---|
| 6,397,204 B1* | 5/2002 | Liu et al. | 707/999.002 |
| 7,426,520 B2* | 9/2008 | Gorelik et al. | 707/999.101 |
| 7,730,060 B2* | 6/2010 | Chakrabarti et al. | 707/723 |
| 2003/0126138 A1* | 7/2003 | Walker et al. | 707/100 |
| 2005/0071345 A1* | 3/2005 | Lin | 707/100 |

\* cited by examiner

*Primary Examiner* — Khanh Pham
(74) *Attorney, Agent, or Firm* — Fish & Richardson P.C.

(57) ABSTRACT

Systems and techniques are provided for receiving an input column and a search keyword and providing one or more suggested columns with which to merge the input column. A coverage score and a refinity score are calculated for potential columns based on the input column as well as a search score based on the search keyword. The one or more suggested columns may be determined based on the coverage score, refinity score, and/or the search score. The input column and/or a potential column may be modified based on a function and the modification may result in a plurality of modified input and/or potential columns. Coverage, refinity, and search scores may be calculated based on the modified columns.

23 Claims, 5 Drawing Sheets

SEARCHING FOR JOIN CANDIDATES

BACKGROUND

Traditionally, adding to or completing a table containing multiple columns and rows requires a user to individually identify values to input in the intended table cells. Generally, the values are retrieved by conducting multiple web searches, such as a different search for each cell. For example, a user may receive a table containing two columns: States and Population. The state column may be filled in and contain a list of each of the 50 states in the USA. The population column may not contain any values and the user may be required to fill in the cells in the population column. Accordingly, the user may utilize a web search engine to input state-population based queries (e.g., "California's Population", "New York's Population", "Virginia's Population", etc.) and input the results into respective cells. For example, a search query for "California's population" may result multiple webpage links. The user may select the first link and be directed to the respective webpage that contains text indicating that California's population is 38,000,000 people. Accordingly, the user may input the value into the respective cell in the state-population table.

Additionally, searching for a cell value based on a corresponding value in a related cell entry generally produces results based specifically on the related cell entry. For example, searching for the population of New York using a search engine will generally produce results only based on the term "New York" and may not account for variations of New York such as "The Big Apple", "The Empire City", "The City that Never Sleeps", etc., which may also produce relevant results.

BRIEF SUMMARY

According to implementations of the disclosed subject matter, an input column containing at least one query value and a search keyword may be received. A first potential table column may be identified and a coverage score may be determined, for the first potential column, based on the number of query values in the input column also contained in at least a portion of the potential table column. Additionally, a refinity score may be determined, for the first potential column, based on a number of occurrences of values from the input column within at least a portion of the first potential column. Additionally, a search keyword score for the first potential column may be determined based on the search keyword and a total score corresponding to the first potential column may be determined based on the coverage, refinity, and search keyword scores. The first potential table may be provided to a user based on the total score.

Systems and techniques according to the present disclosure may allow for searching for tabular data by providing an input column and search keyword. One or more suggested columns may be provided to a user by conducting a search based on the input column and search keyword. Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

A technique that provides one or more relevant suggested columns and/or rows, based on receiving an input query that includes at least a column or row and a search keyword, may enable a user to obtain a completed table in an efficient and seamless manner. As an example, a user may request that a table consisting of two columns [Country, Population] be augmented with "Poverty" data for countries. The input query for disclosed arrangement may be the table [Country, Population], a specified input column (i.e., Country), and the search keyword "Poverty". The expected response may be one or more completed tables containing a Country column that is related to a completed Poverty column. The input query may be compared to potential table columns indexed and stored in a database, and refinity and coverage scores may be computed based on at least a subset of the indexed columns. A coverage score can be based on the number of query values in the input column that are also contained in at least a part of a potential table column. A refinity score can be based on a number of occurrences of values from the input column within at least a part of a potential table column.

Additionally, a search score based on the search keyword may be assigned to at least the subset of the indexed potential columns, as disclosed herein. The user may be provided with one or more suggested columns and/or rows based on the refinity, coverage, and search score. As an example, a user may input a column containing "New York", "California", and "Virginia" and a search keyword "Population". The arrangement may initiate a dual stream process where each stream is processed independently to identify possible suggested columns. The first stream may be a table search stream that scores potential columns based on the search keyword (e.g., Population). A second stream may generate a refinity and coverage score for at least a subset of the potential columns. A total score for the potential columns may be calculated based on their respective search, refinity and coverage scores and one or more suggested columns may be provided to the user based on the total scores. A threshold total, refinity, coverage, and/or search score may be required for a suggested column to be provided to a user. It should be understood that although the substance of the disclosed subject matter refers searches and operations based on columns, the disclosed subject matter may be adopted mutatis mutandis to perform the same operations by using rows. Thus, as used herein, a column based configuration refers similarly to a row based configuration.

Figure 1:
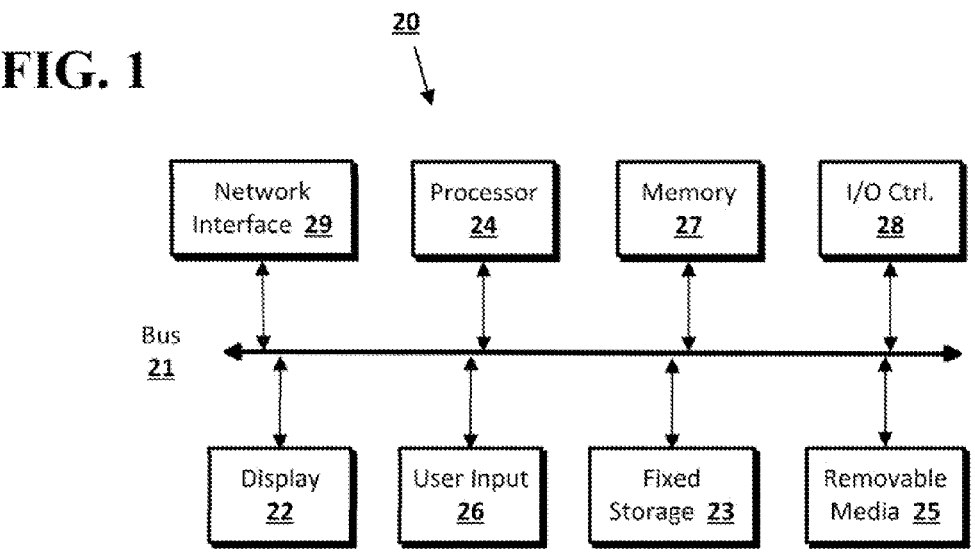
FIG. 1 shows a computer according to an implementation of the disclosed subject matter.

Implementations of the presently disclosed subject matter may be implemented in and used with a variety of component and network architectures. FIG. 1 is an example computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
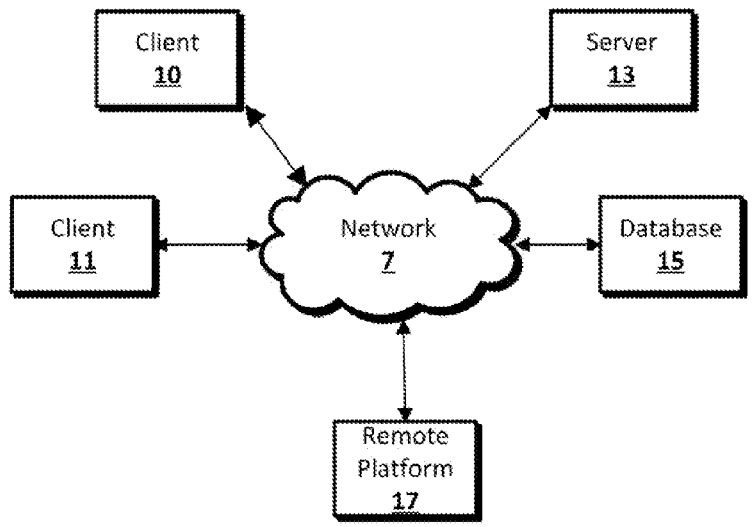
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

According to implementations of the disclosed subject matter, a column containing any applicable form of data may be merged with one or more additional columns, by a merge service. The one or more additional columns may contain data that is related to the data in the original column such that a comprehensible table results from the merge. As an example, a column containing "New York", "California", and "Virginia" may be input into the arrangement along with the search keyword "Population". The following table may be returned to the user based on the column and search keyword:

| | |
|---|---|
| New York | 19,570,261 |
| California | 38,041,430 |
| Virginia | 8,185,867 |

Figure 3:
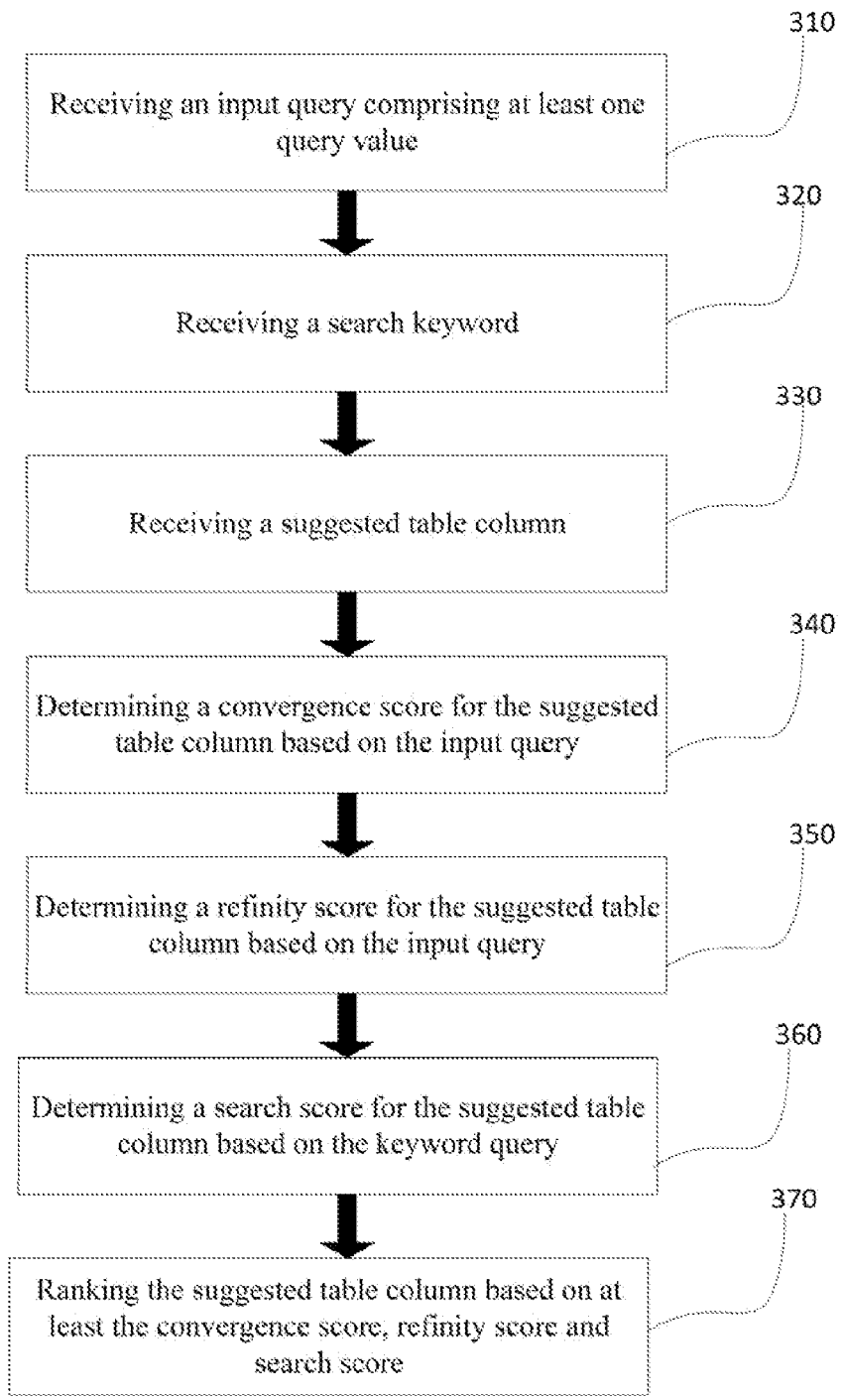
FIG. 3 shows an example process for ranking a suggested table column, according to an implementation of the disclosed subject matter.
Figure 5:
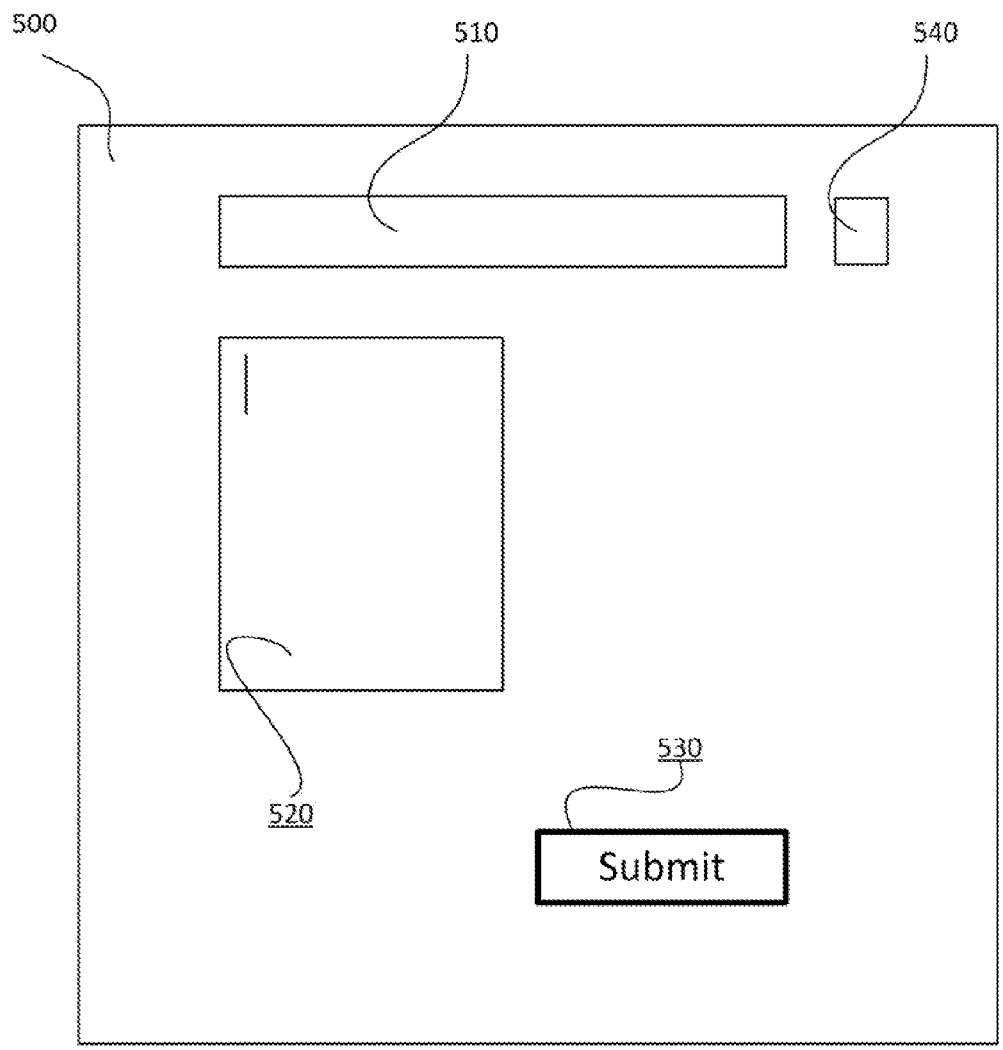
FIG. 5 shows an example illustration of user input interface according to an implementation of the disclosed subject matter.

According to an implementation of the disclosed subject matter, as shown in FIG. 3 at step 310, a user may provide an input column by manually inputting values using a user interface or by any other applicable means such as uploading a stored table, specifying a table by inputting the table location (e.g., a URL, file location, an HTML tag, etc.), or the like. A user interface for a manual upload may provide the user with two input fields, a first field to input a search keyword and a second field to input column values. In an illustrative example, as shown in FIG. 5, a user may be provided with an input screen 500 containing a first input field 510 and a second input field 520. The arrangement may place a limit on the number of column values that can be input into the second field 520. The limit may be based on any applicable factor such as aesthetic criteria, overburdening a component of the arrangement, available memory, user permission (e.g., a user that pays for the service may be able to input a larger number of column values in comparison to a user that receives the service for free), or the like. At step 320, the user may input a search keyword into the first input field 510. Additionally, the user interface may contain a numerical value input field 540 where a user inputs a value corresponding to a threshold coverage score, refinity score, or search score and the suggested columns provided to the user may be filtered based on the threshold score. Alternatively or in addition, a default value may be automatically generated and input into the numerical value input field 540, and may be modified by the user. Upon receiving a selection of the Submit button 530, the arrangement may access a corpus of tabular data, at step 330, and score the data as disclosed herein.

According to an implementation of the disclosed subject matter, at step 350, a refinity score may be calculated for a potential column based on an average number of occurrences of distinct values contained in the potential column that are also contained in the input column. The refinity may be understood as the multiplicity of the input column if joined with the potential column. Notably, the refinity score of a potential column may indicate the ratio of occurrences of values from an input column found in a potential column. The refinity score may be calculated based on the following formula:

$$\text{Refinity}(T_s, C_s) = \left( \sum_{v_i \in V_i} |v_i, cnt_i| / |V_s| \right)$$

Let $T_q$ be the provided input query table and $C_q$ be the query column, $T_s$ be a potential table and $C_s$ be the potential column from within the potential table. Additionally, let $V_i$ be the set of distinct values after projecting a column $C_i$ of table $T_i$ and $cnt_i$ be the number of occurrences of $v_i$ in $(T_s, C_s)$. For example, an input column may contain "George Washington", "John Adams", and "Thomas Jefferson". A potential column may contain three instances of "George Washington", four instances of "Thomas Jefferson", and no instances of "John Adams". Accordingly, the refinity may be (3/2)+(4/2)+(0/2)=7/2 based on the three instances of "George Washington" divided by 2 for the presence of two of the three president's names being present in the potential column plus the four instances of "Thomas Jefferson" divided by 2 for the presence of two of the three president's names being present in the potential column plus zero (based on zero instances of John Adams). Alternatively, if the potential column also included one instance of "John Adams", then the refinity would be (3/3)+(4/3)+(1/3)=8/3. Note that the number of distinct values found in the potential column may not exceed the number of distinct values in the input column. Accordingly, in continuing the previous example, the value for $V_s$ may not exceed 3 as the input column only contains the three distinct values (i.e., "George Washington", "John Adams", and "Thomas Jefferson").

According to an implementation, an optimal refinity score may be 1 as it may indicate that the potential table contains a one to one match for the distinct values contained in the input column. As an example, an input column may contain three distinct values, "George Washington", "John Adams", and "Thomas Jefferson". A potential column may contain one instance of "George Washington", one instance of "Thomas Jefferson", and one instance of "John Adams". Accordingly, the refinity may be (1/3)+(1/3)+(1/3)=1 based on each instance of the three distinct values present in the potential column. Notably, it is more likely that a one-to-one relation between the input column values and potential column values indicates that the potential column contains the intended information. A refinity that is greater than 1 may result from at least one distinct value, from an input column, being present more than once in the potential column. A repeated distinct value in a potential column may indicate that the potential column is not separated in a similar manner as the input column. For example, a search keyword provided by a user may be "Population" and a potential column corresponding to an input column containing "New York", "California", and "Virginia" may contain "New York" 62 times, "California" 58 times, and "Virginia" 95 times. Accordingly, the refinity would be (62/3)+(58/3)+(95/3)=215/3=71.67. It is likely that the potential column corresponds to another column that lists the counties within respective state as well as county population information. The county population information is unlikely to be the information that the user intended to merge with the input column as the input column contained three distinct states. Therefore, the high refinity value (71.67) may correspond to a less desirable result than a column with a lower refinity.

According to an implementation of the disclosed subject matter, at step 340, a coverage score may be calculated for a potential column based on the proportion of values in the input column that are also present in the potential column. The coverage score for a potential column may be understood as the number of values in the input column that are covered by the potential column. The coverage score may be calculated based on the following formula:

$$\text{Coverage}(T_s, C_s) = |V_q \cap V_s| / |V_q|$$

Let $T_q$ be the provided input query table and $C_q$ be the query column, $T_s$ be a potential table and $C_s$ be the potential column from within the potential table. Additionally, let $V_i$ be the set of distinct values after projecting a column $C_i$ of table $T_i$. For example, an input column may contain "George Washington", "John Adams", and "Thomas Jefferson". A potential column may contain two instances of "George Washington", one instances of "Thomas Jefferson", and no instances of "John Adams". Accordingly, the coverage may be 2/3 based on the potential column containing two values that are also contained in the input column (i.e., "George Washington" and "Thomas Jefferson") divided by the total number of distinct values contained in the input column (i.e., 3 for "George Washington", "John Adams", and "Thomas Jefferson". Alternatively, if the potential column only included four instances of "George Washington" and no instances of "John Adams" or "Thomas Jefferson" then the coverage score would be 1/3 based on the presence of one out of the three distinct values. Note that $V_q$ is a constant value corresponding to the input column and, thus, does not change based on the potential column. Accordingly, in relation to the previous examples, the value for $V_q$ remains the same (i.e., 3) for a potential column containing two instances of "George Washington", one instances of "Thomas Jefferson", and no instances of "John Adams" as well as for a potential column containing four instances of "George Washington" and no instances of "John Adams" or "Thomas Jefferson".

According to an implementation, an optimal coverage score may be 1 as it may indicate that the potential table contains all the distinct values that are contained in the input column. As an example, an input column may contain three distinct values, "George Washington", "John Adams", and "Thomas Jefferson". A potential column may contain one instance of "George Washington", two instance of "Thomas Jefferson", and one instance of "John Adams". Accordingly, the coverage score may be (3/3)=1 based on at least one instance of the three distinct values being present in the potential column. Notably, it is more likely that a potential table that contains each distinct value in an input table is likely to be more applicable to the input table than a potential table that does not contain each distinct value. A coverage score that is lower than 1 may result from at least one distinct value, from an input column, not being present in the potential column. A non-present value may indicate that the potential table does not contain a complete data set to match with the input table. For example, a search keyword provided by a user may be "Population" and a potential column corresponding to an input column containing "New York", "California", and "Virginia" may contain "New York" 3 times, "California" 2 times, and "Virginia" 0 times. Accordingly, the coverage score would be 2/3 based on two of the three values being present in the potential column. Therefore, a higher coverage score is more desirable than a lower coverage score as a higher score corresponds to more distinct values, in an input column, also being present in the potential column.

According to an implementation of the disclosed subject matter, at step 360, a search score may be calculated for one or more potential tables. The search score may be calculated independent of the refinity and coverage score such that the search score for a potential table is calculated without factoring in the refinity or coverage score. The search score may be based on any applicable factor such as text matching, historical matching, user profile information, geo-location, query category, advertisement value, context matching, current event, social media value, or the like. As an example, a user may input the search keyword "Population" using a user interface and the arrangement may assign a first potential table, containing the word "Population" as a title to a column, a search score of 0.7. The arrangement may assign a second potential table, containing the word "Population" as a title to a column as well as a high historical access score, a search score of 0.75. The search score may be calculated independent of values in the input column such that the search score calculation is based only on the search keyword. As an example, a user may input an input column and a search keyword, "Location". The arrangement may generate a search score for one or more potential tables based only on the search keyword "Location", independent of the values in the input column. Alternatively, the search score may be calculated based on one or more values in the input column such that the search score calculation is based on the search keyword and the input column. As an example, the arrangement may determine a common category based on the input column (e.g., the category of "USA State" based on an input column of "New York", "California", and "Virginia"). A user may also input "Population" as the search keyword. Accordingly, a search score for a potential table may be determined based on both the search keyword "Population" as well as the common category of "USA State". More specifically, incorporating both the search keyword and one or more values from the input column into the search score may result in a more targeted potential tables.

According to implementations of the disclosed subject matter, a refinity, coverage, and/or search score may be determined based on a sample of the input column. Using a sample of the input column, when calculating a respective score, may allow faster processing of a corpus of potential table data. As an example, calculating refinity scores for potential tables in a corpus, for an input column containing 100 values, may consume an unacceptable amount of time. However, a representative set of 10 values selected from the set of 100 values may require substantially lower processing time and, thus, may be identified and used by the arrangement. The sample may be any applicable subset of the entire input column such as a predetermined portion (e.g., a number of sample values, a percentage of sample values, a user setting, etc.) a dynamically determined portion (e.g., based on a percentage of the size of the input column, a search keyword, a user history, system capacity, a machine trained determination, etc.), or the like. According to an implementation, if one or more scores is unacceptable (e.g., if scores for multiple potential columns are not distinguished enough such that they allow the arrangement to distinguish between the potential columns), then the arrangement may modify the sample size of the input column and re-score the potential columns. Similarly, a refinity, coverage, and/or search score for a potential column may be determined based on a sample of the potential column. Using a sample of one or more potential columns to calculate scores may allow faster processing of a corpus of potential table data, as disclosed herein.

According to implementations of the disclosed subject matter, a potential column may qualify as a suggested column only if the coverage, refinity, or search score for the potential column meets a threshold requirement. Given a user query Q=(table, input column identifier, keyword, coverage threshold c, refinity threshold r, answer limit m), the arrangement may return an ordered list P={$P_1$ ... $P_n$} where $P_i$=(table, column identifier) pairs such that:

$n \le m$ coverage($P_i|Q$)$\ge c$ refinity($P_i|Q$)$\le r$

Here, a potential column may be suggested if the coverage score for the potential column is greater than a threshold value c and if the refinity score for the potential column is below a threshold value r. A threshold value for a refinity, coverage, or search score may be based on any applicable factor such as historical data, available suggested columns, available potential columns, user setting, system setting, or the like. As an example, as shown in FIG. 5, a user may input a threshold value, such as 0.9, for a minimum coverage score into the numerical value input field 540. Accordingly, the arrangement may reject any potential columns that receive a coverage score of less than, for example, 0.9 and, thus, may not suggest those columns to be merged with an input table or column.

As disclosed herein, the arrangement may use an inverted index of data to evaluate potential columns and provide suggested columns. An inverted index may map each cell value of a table within a corpus to a set of (table ID, column ID, and row count) triple. The (table ID, column ID) pair may identify the column of a potential table where the value is retrieved from and the row count may be the number of occurrences of the value in the same column. Refinity and coverage scores may be calculated by retrieving the table with the table ID and sample at least a set of random values of the column identified by the column ID. For each value in the sample, the inverted index may be accessed to retrieve a list of (table ID, column ID, and row count) triples. A union of all lists may be identified and represented as a table "index_table" (table_ID, column_ID, row_count). As an example, the coverage may be approximated by the following query:

SELECT table_id, column_id, COUNT(*)/sample_size AS coverage
    FROM index_table
    GROUP BY table_id, column_id Similarly, Refinity may be approximated by the following query:

SELECT table_id, column_id, SUM(row_count)/COUNT(*)
    FROM index_table
    GROUP BY table_id, column_id The coverage score and refinity score of a potential column with respect to a given (table_ID, column) input may be defined in accordance with techniques disclosed herein.

According to an implementation of the disclosed subject matter, at step 370, a total score for a suggested table/column may be determined based on the coverage score, refinity score, search score, and/or any other applicable factor (e.g., a popularity score, user history, user location, user setting, etc.). The total scores may be determined by a server local to the merge service or a remote server and may be determined based on any applicable set of rules. As an example, a total score for a given column, C, in a table T may be determined based on the following equation:

$$\text{TotalScore}(T,C) = [\text{Coverage}(T,C)/\text{Refinity}(T,C)] + \text{SearchScore}(T,C)$$

As indicated by the equation, a column in a table receives a higher total score for a higher coverage and search score and for a lower refinity score. The total score may be used by a merge service to determine which potential columns are to be suggested to a user. For example, the merge service may suggest the potential columns with the top m highest total scores. More specifically, a merge service may only provide a user with the potential columns with the top 10 total scores. The merge service may suggest columns to a user only if the potential column receives a threshold total score and the threshold may be generated by the arrangement or provided by a user. Notably, the total score may be used by a merge service to rank two or more potential columns and to select acceptable columns to provide to a user.

According to an implementation of the disclosed subject matter, the arrangement may allow seamless integration of transformation functions on the tabular data. A transformation function may be any applicable function that modifies at least part of the data in the input table or potential tables in the corpus such as modifying text (e.g., converting to upper case or lower case, translating, transliterating, localizing, etc.), modifying a value (e.g., rounding a number, applying a formula, calculating a location, etc.), converting the data based on a predetermined or dynamic rule set, or the like. For a given transformation function F:S→S, the function for creating an index entry may be:

$$\text{index}(s, \text{table id}, \text{column id}, \text{row count}) = s \cdot (\text{table id}, \text{column id}, \text{row count})$$

The function may be modified based on the transformation function (f(s)) as:

$$\text{index}(s, \text{table id}, \text{column id}, \text{row count}) = f(s) \cdot (\text{table id}, \text{column id}, \text{row count})$$

An original function for looking up potential tables may be "lookup(s)", and may be modified to lookup values with the transformation function as "lookup(f(s))". As an example, an input column and potential tables in a corpus may contain mixed uppercase and lowercase text. A function to convert text into all uppercase may be applied to both the input table and the potential tables in the corpus. Accordingly, calculation of a coverage and/or refinity score may be made based on the transformed input column and potential tables. Additionally, values that may have originally been mismatched based on different text casing may be matched after the transformation uniformly cased the text. As another example, an input table may contain names of the cities, "San Francisco", "San Diego", and "Los Angeles" and the search keyword may be "Italian Restaurants". The corpus may contain locations based on GPS coordinates and, thus, may not contain information identifying the GPS coordinates as specifically corresponding to a city. At least a subset of the GPS data in the corpus may be transformed such that the coordinates are converted to identify the city that they correspond to. For example, a GPS coordinate (−31.4250142, −62.0841809) may be converted to "San Francisco" as it is within the city's boundaries. Accordingly, potential tables with GPS coordinates converted to city names may be assigned coverage and refinity scores based on the city names in the input column and the city names in the converted potential tables.

A transformation function may be used to map a value to a set of values. As an example, an input column may contain the text "Bell", which may correspond to various annotations such as an object that makes a sound, a telephone company, or a restaurant. Accordingly, it is beneficial to calculate coverage and refinity scores in view of the different annotations as it may enable the arrangement to avoid determining an applicable annotation. For a given transformation function g:S→{S} that maps a value to a set of values, the function for creating the index entry may be:

$$\text{index}(s, \text{table id}, \text{column id}, \text{row count}) = s \cdot (\text{table id}, \text{column id}, \text{row count})$$

and may be modified to a set of entries, as:

$$\text{index}(s, \text{table id}, \text{column id}, \text{row count}) = \{s' \cdot (\text{table id}, \text{column id}, \text{row count}), s' \in g(s)\}$$

An original function for looking up potential tables may be "lookup(s)", and may be modified to return a set of values as lookup(s)={lookup(s'), s'∈g(s)}. A table of triples, as disclosed herein, may be grouped by an additional factor (i.e., a value) such that they are arranged according to (value, table ID, column ID, row count). The coverage and refinity score for a (table ID, column ID, and row count) set may be different for a given value. Continuing the previous example, an input column may contain "Bell", "Drum", and "Clarinet" and may mapped using three different values such that, as an example, the following three columns are effectively formed:

| Bell/Instrument/ | Bell/Telephone/ | Bell/Restaurant/ |
|---|---|---|
| Drum | Drum | Drum |
| Clarinet | Clarinet | Clarinet |

The different mappings of a value may be generated based on any applicable annotation generation technique such as historical data, input value matching, machine learning, or the like. The arrangement may calculate coverage and refinity scores based on all three columns and, accordingly, generate total scores and provide the highest ranking columns to a user. Similarly, a transformation function mapping a value to a set of values may be applied to values in potential table and, thus, the available number of potential tables may increase based on the number of annotations.

Notably, applying functions based on two or more annotations for a given value, and applying the techniques discussed herein towards the two or more annotations can result avoiding performing reconciliation to determine candidate results. Reconciliation may be the process of determining the correct annotation to pick for a given value in a table. As an example of not requiring reconciliation, an input column may contain "Bell", "Drum", and "Clarinet" and the following potential columns may be scored by the arrangement without reconciliation of the correct annotation of Bell (e.g., as an instrument or a telephone company):

| Row 1 | Row 2 |
|---|---|
| Bell | Bell |
| Flute | AT&T ™ |
| Clarinet | Verizon ™ |

According to the techniques disclosed herein, the coverage score for Row 1 may be 2/3 based on the matching "Bell" and "Clarinet" and the coverage score for Row 2 may be 1/3 based only on the matching "Bell". A threshold coverage score of 1/2 may be required for a potential column to be suggested to a user and, accordingly, Row 2 may not be suggested to a user and Row 1 may be suggested to the user. Namely, no reconciliation regarding whether the "Bell" in the input column corresponds to an instrument or a telephone company is required as the coverage and refinity scores may inherently reduce the probability of providing a user with merge options with inapplicable annotations.

Figure 4:
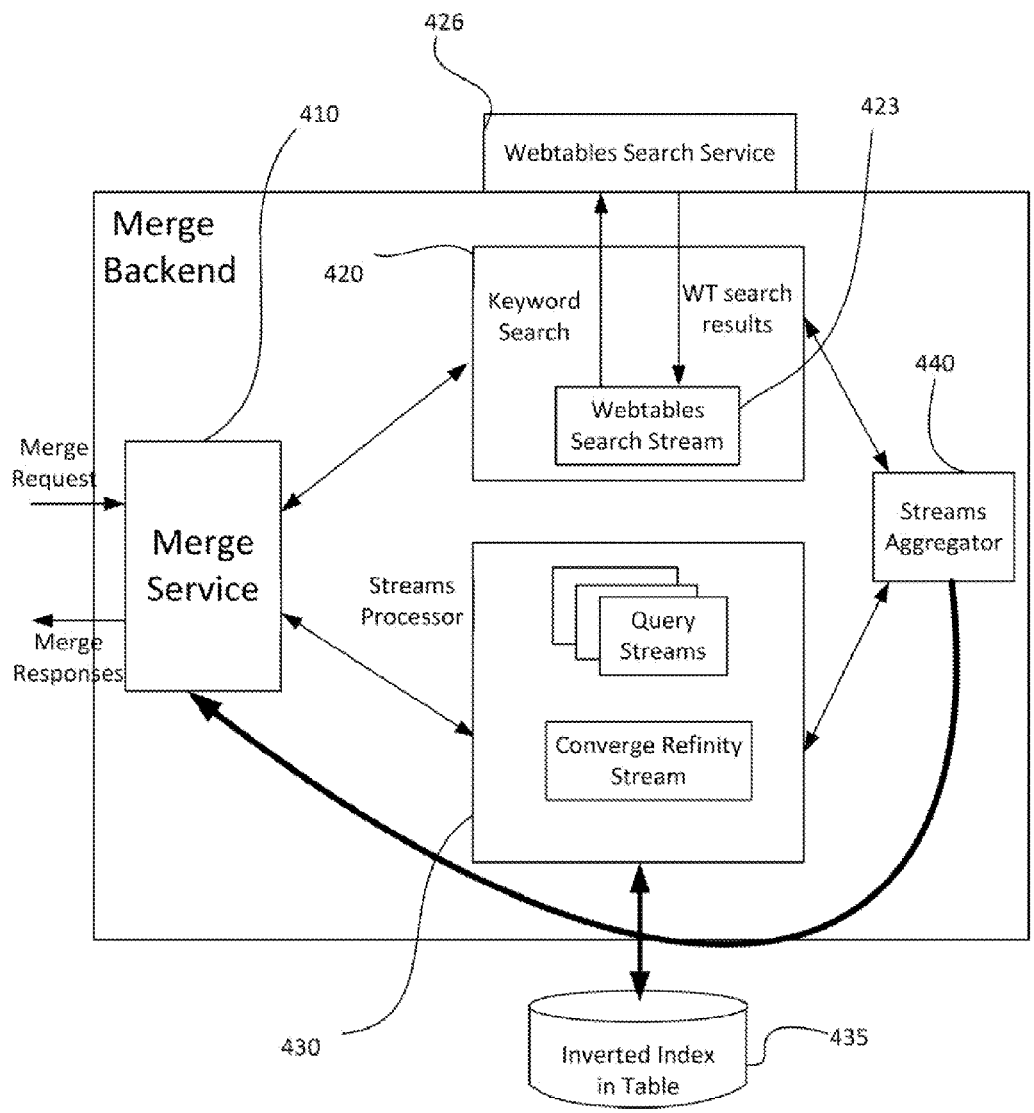
FIG. 4 shows an example illustration of a tabular search system according to an implementation of the disclosed subject matter.

In an illustrative example of the disclosed subject matter, as shown in FIG. 5, a user interface 500 may be provided to a user who may input a search keyword using the input bar 510 and an input table and column id using input area 520. As shown in FIG. 4, a merge request comprising the input table, column identifier, and search keyword may be received by a merge service 410. A sample of the input column may contain {"CA", "NY", "WI"} and the search keyword may be "Population". The merge service may transmit the merge request to two independent streams, a keyword search 420 and a coverage refinity stream 430. The keyword search 420 may use a web tables search stream 423 to access a webtables search service 426 and provide a search score for multiple columns contained in tables received from the webtables search service. The coverage refinity stream may identify the input column data ({"CA", "NY", "WI"}) as being present in the following triples contained an inverted index 435:

| Value | List of (table id, column id, row count) triples |
|---|---|
| CA | (1, 1, 5), (2, 1, 3), (3, 5, 2) |
| NY | (2, 2, 9), (3, 5, 1), (4, 7, 3) |
| WI | (1, 1, 6), (3, 5, 1), (2, 1, 1) |

Specifically, the value "CA" may be identified as being present in a $1^{st}$ table at a $1^{st}$ column, a total of 5 times; a $2^{nd}$ table at a $2^{nd}$ column, a total number of 3 times, and in a $3^{rd}$ table at a $5^{th}$ column, a total number of 2 times. The triples for "NY" and "WI" are similarly distributed. Based on the list of triples, the following table may be generated:

| Table ID | Column ID | Row Count |
|---|---|---|
| 1 | 1 | 5 |
| 2 | 1 | 3 |
| 3 | 5 | 2 |
| 2 | 2 | 9 |
| 3 | 5 | 1 |
| 4 | 7 | 3 |
| 1 | 1 | 6 |
| 3 | 5 | 1 |
| 2 | 1 | 1 |

The table may not contain the specific values that the table ID, column ID and row count are based on in order to calculate the refinity and coverage scores as the scores may not need to factor in the specific values. The coverage and refinity scores may be calculated, as disclosed herein, and as shown in the following table:

| Table ID | Column ID | Row Count | Coverage | Refinity |
|---|---|---|---|---|
| 1 | 1 | 5 | 2/3 | 11/2 |
| 1 | 1 | 6 | | |
| 2 | 1 | 3 | 2/3 | 4/2 |
| 2 | 1 | 1 | | |
| 2 | 2 | 9 | 1/3 | 9/1 |
| 3 | 5 | 2 | 3/3 | 4/3 |
| 3 | 5 | 1 | | |
| 3 | 5 | 1 | | |
| 4 | 7 | 3 | 1/3 | 3/1 |

Note that each unique column is assigned a coverage and refinity score. For example, Column 1 in Table 2 receives a coverage score of 2/3 based on 2 of the distinct values being present in the column as well as a refinity score of 4/2 based on 4 instances of the 2 distinct values being present in the column. Similarly, Column 2 in table 2 receives a coverage score of 1/3 based on only 1 of the distinct values being present in the column as well as a refinity score of 9/1 based on 9 instances of the 1 distinct value being present in the column.

Figure 6:
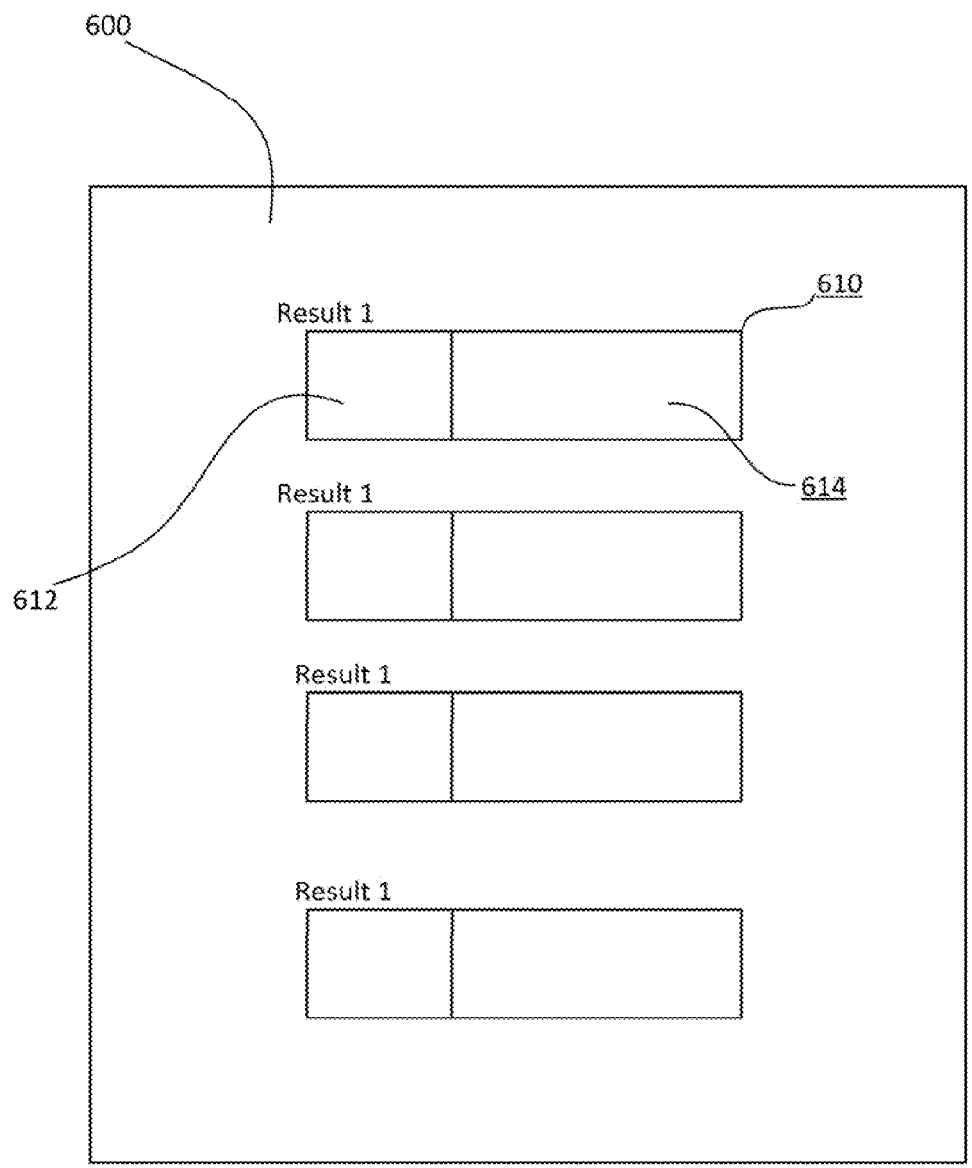
FIG. 6 shows an example illustration of suggested merge results according to an implementation of the disclosed subject matter.

The search score calculated by the search stream 420 and the coverage and refinity scores calculated by the coverage refinity stream 430 may be received by a stream aggregator 440 and be combined into a total score. The total score may be provided to the merge service that received the merge request and, based on ranking suggested columns based on the total scores, the merge service may provide the user with suggested columns that the input column or table may be merged with. As shown in FIG. 6, the user may be provided with a results page 600 containing one or more suggested results 610. The results may be organized such that the input column 612 is displayed adjacent or proximate to a suggested column 614. The suggested columns may be arranged based on the top score. As an example, the highest scoring suggested column may be displayed above the second highest scoring suggested column.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
receiving an input column comprising a plurality of query values;
receiving a search keyword;
identifying a first potential table column;
determining a coverage score for the first potential table column, wherein the coverage score is based on the number of query values in the input column also contained in at least a portion of the first potential table column;
determining a refinity score for the first potential table column representing a similarity between the first potential table column and the input column, wherein the refinity score is based on an average number of occurrences of values from the input column within at least a portion of the first potential table column;
determining a search keyword score for the first potential table column based on the search keyword; and
determining a first total score corresponding to the first potential table column based on the coverage score, the refinity score, and the search keyword score.

2. The method of claim 1, further comprising providing the first potential table column to a user based on the first total score.

3. The method of claim 1, wherein the search keyword is input by a user.

4. The method of claim 1, wherein receiving an input column comprising at least one query value further comprises:
receiving an input table comprising the input column; and
receiving a column ID corresponding to the input column.

5. The method of claim 1, wherein the search keyword corresponds to a column heading.

6. The method of claim 1, wherein the first potential table column is selected from a corpus of data.

7. The method of claim 6, wherein the corpus of data is uploaded data in a database.

8. The method of claim 6, wherein the corpus of data is gathered from web crawlers.

9. The method of claim 6, wherein the corpus of data is index based on a table ID, column ID, and row count.

10. The method of claim 1, wherein the search keyword score for the first potential column is determined independent of the refinity score.

11. The method of claim 1, wherein the search keyword score for the first potential column is determined independent of the coverage score.

12. The method of claim 1, further comprising providing the first potential column to a user based on the coverage score, the refinity score, and the search keyword score.

13. The method of claim 1, further comprising:
ranking the first potential column based on the first total score;
ranking a second potential column based on a second total score; and
providing the first potential column and the second potential column in an order based on the rankings for the first potential column and the second potential column.

14. The method of claim 1, further comprising:
ranking the first potential column based on the first total score;
ranking a second potential column based on a second total score;
selecting the first potential column based on the rank for the first potential column and the rank for the second potential column; and
providing the first potential column instead of the second potential column based on the selection.

15. The method of claim 12, further comprising providing the first potential column to a user if the coverage score is above a threshold.

16. The method of claim 12, further comprising providing the first potential column to a user if the refinity score is below a threshold.

17. The method of claim 1, further comprising:
generating a first modified input column by applying a first function to the input column;
generating a first modified index by applying a second function to the index;
identifying the potential table column, from the first modified index, based on the first modified input column.

18. The method of claim 17, wherein the first function and the second function are the same.

19. The method of claim 1, further comprising:
generating a first modified input column by applying a first function to the input column;
identifying the potential table column, from the index, based on the modified input column.

20. The method of claim 1, further comprising determining the first total score based at least on dividing the coverage score by the refinity score.

21. A system comprising:
a database storing a corpus of data;
a processor in connection with said database, said processor configured to:
receive an input column comprising a plurality of query values;
receive a search keyword;
identify a first potential table column;
determine a coverage score for the first potential table column, wherein the coverage score is based on the number of query values in the input column also contained in at least a portion of the potential table column;
determine a refinity score for the first potential table column representing a similarity between the first potential table column and the input column, wherein the refinity score is based on an average number of occurrences of values from the input column within at least a portion of the first potential table column;
determine a search keyword score for the first potential table column based on the search keyword; and
determine a first total score corresponding to the first potential table column based on the coverage score, the refinity score, and the search keyword score.

22. The system of claim 21, further configured to provide the first potential table column to a user based on the first total score.

23. The system of claim 21, further configured to:
generate a first modified input column by applying a first function to the input column;
identify the potential table column, from the index, based on the modified input column.

* * * * *